United States Patent [19]
de Groot

[11] Patent Number: 5,644,562
[45] Date of Patent: Jul. 1, 1997

[54] METHOD AND APPARATUS FOR MEASURING AND COMPENSATING BIREFRINGENCE IN ROTATING DISKS

[75] Inventor: Peter de Groot, Middletown, Conn.

[73] Assignee: Zygo Corporation, Middlefield, Conn.

[21] Appl. No.: 608,258

[22] Filed: Feb. 28, 1996

[51] Int. Cl.⁶ .............................. G11B 7/00; G01B 9/02
[52] U.S. Cl. .......................... 369/110; 356/351; 356/357; 356/369
[58] Field of Search ................ 369/47, 50, 100, 369/110; 356/357, 358, 351, 364, 365, 367, 369

[56] References Cited

U.S. PATENT DOCUMENTS

| | | |
|---|---|---|
| 3,855,625 | 12/1974 | Garnier et al. |
| 4,593,368 | 6/1986 | Fridge et al. ............... 356/357 X |
| 4,606,638 | 8/1986 | Sommargren ............... 356/358 X |
| 5,218,424 | 6/1993 | Sommargren ............... 356/358 |
| 5,280,340 | 1/1994 | Lacey ........................... 356/357 |
| 5,557,399 | 9/1996 | de Groot ..................... 356/357 |

OTHER PUBLICATIONS

"Optical Shop Testing", Second Edition, Edited by Daniel Malacara, Chap. 1, pp. 1–49 (Wiley, New York, 1992).

B. Bhushan, "Tribology and Mechanics of Magnetic Storage Devices", pp. 765–797 (New York: Springer–Verlag, 1990).

C. Lacey, R. Shelor, A. Cormier, "Interferometric measurement of disk/slider spacing: The effect of phase shift on reflection", (IEEE Transactions on Magnetics), vol. 29, No. 6, Nov. 1993.

"Handbook of Optics", Chap. 27, vol. II, pp. 27.1–27.27 (McGraw–Hill, Inc. 1995).

Primary Examiner—P. W. Huber
Attorney, Agent, or Firm—Bryan Cave LLP

[57] ABSTRACT

An apparatus and method for measuring and compensating for birefringence in a rotating ground glass disk (20) such as are employed in polarization based optical flying height testers. The polarized light (1, 3) impinges on the top surface (24) of the disk (20) and is refracted through the disk to a measurement point (90) on the opposite surface (25) from which it is reflected back through the disk (20) and refracted before it exits the disk (20) in a beam (9) containing both s and p polarizations which are detected by a phase detector (13) which measures any difference in phase between the s and p polarizations. Any variation of the phase $\theta_G$ with respect to the position defined by the measurement point provides the birefringence parameters $b_\parallel, b_\perp$ for the positions on the disk (20). The phase detector (13) measures the phase $\theta_G$ at a skew angle $\zeta$ defined between the plane of incidence (101), defined by the existing beam (9) and the incident beam (3), drawn through the measurement point (90) perpendicular to a radius line (102) for the disk (20).

39 Claims, 5 Drawing Sheets

METHOD AND APPARATUS FOR MEASURING AND COMPENSATING BIREFRINGENCE IN ROTATING DISKS

CROSS-REFERENCE TO RELATED APPLICATIONS

This application is related to the following commonly owned U.S. Patent Applications, and is an improvement thereon: Serial No. 08/408907, filed Mar. 22, 1995, now U.S. Pat. No. 5,557,399, entitled "Optical Gap Measuring Apparatus and Method" to Peter de Groot and Les Deck; copending Ser. No. 08/381232, filed Jan. 31, 1995, entitled "Interferometer and Method for Measuring the Distance of an Object Surface with Respect to the Surface of a Rotating Disk", to Peter de Groot; and copending Ser. No. 08/523559, filed Sep. 5, 1995, entitled "Homodyne Receiver and Method", to Peter de Groot.

BACKGROUND OF THE INVENTION

1. Field of the Invention

The present invention relates to high-speed, high precision measurement of the distance between two surfaces, one of which is on a substantially transparent element. In particular, the invention relates to an apparatus and method for measuring and compensating birefringence in the transparent element.

2. Description of the Prior Art

A frequently-encountered problem in industrial inspection and quality control is the precise measurement of small distances between surfaces. In magnetic data storage systems, for example, it is required to measure the flying height of a slider on a rapidly rotating rigid disk in order to verify the performance of the slider assembly. The flying height, as used herein, is the distance between the magnetic head pole and the surface of the rotating rigid disk; see, e.g., M. F. Garnier, et. al., U.S. Pat. No. 3,855,625 issued Dec. 17, 1974. The flying heights are generally less than 250 nm (10μ-inch) depending on the design of the slider, and may be as close as a few tens of nanometers. In that the flying height is a critical performance parameter in magnetic data storage systems, the dynamic measurement of flying height plays a central role in the design and production testing of sliders.

Optical means for measuring the flying height are known as optical flying height testers (OFHT's). High-precision OFHT's are almost invariably based on interferometry. Interferometers are capable of determining the distance to an object, the topography of the object, or like physical parameters involving physical lengths (see, for example, Chapter 1 of the book *Optical Shop Testing*, second edition, edited by Daniel Malacara (Wiley, New York, 1992). One of the fundamental difficulties of prior art optical techniques is that the interface between the slider ABS and a real hard disk cannot be inspected directly. Most OFHT's therefore use a transparent surrogate disk, most commonly a glass disk, in place of a real magnetic hard disk. The measurement light beam passes through the glass disk before and after interacting with the slider-glass interface. The optical interference effect at the slider-glass interface provides the necessary information for flying height measurement. Examples of prior-art OFHT's incorporating a glass disk may be found in U.S. Pat. No. 4,593,368 to D. A. Fridge, et al. and in U.S. Pat. No. 5,280,340 to C. Lacey. Further examples of prior art systems for measuring the flying height of a slider assembly are disclosed in B. Bhushan, *Tribology and Mechanics of Magnetic Storage Devices*, pp. 765–797 (New York: Springer-Verlag, 1990).

The interaction between the glass disk and the measurement beam is important to the accuracy of the flying-height measurement. This is particularly true for a class of prior-art OFHT's that employ polarized light as part of the measurement principle. A polarization-based OFHT measures the flying height by the detection and analysis of the polarization-dependent characteristics of a beam or combination of beams reflected at an oblique angle from the slider-disk interface. Advantageous features of polarization-based OFHT's include high accuracy, improved reliability with respect to competitive systems, and the ability to measure down to actual contact. Examples of prior art polarization-based OFHT's are provided in commonly-owned U.S. Pat. Nos. 4,606,638 and 5,218,424, both to G. Sommargren, my commonly owned copending U.S. Patent Application entitled "Interferometer and Method for Measuring the Distance of an Object Surface with Respect to the Surface of a Rotating Disk", filed Jan. 31, 1995 and bearing U.S. Ser. No. 08/381232, and in my commonly owned copending U.S. Patent Application entitled "Optical Gap Measuring Apparatus and Method", filed Mar. 22, 1995, and bearing U.S. Ser. No. 08/408907.

A difficulty with polarization-based OFHT's is that they are sensitive to any polarization-dependent phenomena in the glass disk, including birefringence, which may be defined as polarization-dependent variation in the index of refraction of the glass disk. Birefringence modifies the polarization state of the measurement beam in a manner inconsistent with the measurement principles as taught in the above-cited prior art. Of special concern is the influence of birefringence generated by the stress pattern in a rapidly-rotating glass disk. The resulting measurement errors can be as large as 50 nm. Although polarization-based OFHT's are well known in the art, the prior art does not provide any means of measuring or compensating birefringence in such polarization-based OFHT's.

An additional deficiency in prior art methods of flying height testing is the phase change that occurs at the slider surface upon reflection. The phase change can easily be misinterpreted as a change in flying height, resulting in errors as large as 20 nm. To correct for this effect, one must know the phase change exactly, using a priori knowledge of the complex index of refraction of the material. See for example, the article entitled "Interferometric measurement of disk/slider spacing: The effect of phase shift on reflection," by C. Lacey, R. Shelor, A. Cormier (IEEE Transaction on Magnetics). Most often, an instrument known in the art as an ellipsometer measures the complex index of the slider in a separate metrology step, independent of the OFHT. In my commonly owned copending U.S. Patent Application entitled "Optical Gap Measuring Apparatus and Method", filed Mar. 22, 1995, and bearing U.S. Ser. No. 08/408907, a method is proposed for measuring the complex index of the slider in situ, comprising a polarization-based OFHT and analysis of data acquired during a load or unload of the slider. This approach obviates the need for a separate metrology station, since the apparatus for the complex-index measurement comprises substantially the same apparatus employed for the flying height measurement. However, since the method and means disclosed in the aforementioned copending U.S. patent application Ser. No. 08/1408907 also comprise the analysis of a polarized beam that passes through the glass disk, birefringence can adversely affect the accuracy of the complex index measurement.

An alternative approach to measuring the complex index of refraction of the slider is to incorporate a known form of ellipsometer in an existing flying height tester. Known forms of ellipsometer are taught in Chapter 27 of the book "Handbook of Optics", vol. II (McGraw-Hill, Inc., 1995), pp.27.1–27.27. However, since ellipsometers analyze the change in polarization of a beam reflected at an oblique from the surface of the material being tested, birefringence in the rotating glass disk also adversely affects the ellipsometric analysis. The birefringence phenomenon therefore places severe limitations on the ability of an ellipsometer to perform in-situ measurements of the complex index. Thus the prior art does not provide a satisfactory method and means for in-situ measurement of the complex index in the presence of glass-disk birefringence. These disadvantages of the prior art are overcome by the present invention.

There is therefore a critical, unmet need for a method and apparatus for measuring and compensating birefringence in rotating disks, particularly with regard to flying height testing and related techniques for in-situ measurement of the index of refraction of sliders. These disadvantages of the prior art are overcome by the present invention.

SUMMARY OF THE INVENTION

The present invention provides a method and apparatus for measuring and compensating for birefringence in rotating glass disks, such as are employed in polarization-based Optical Flying Height Testers (OFHT's). Birefringence in the glass disk is a polarization-dependent variation in the index of refraction of the glass disk. A polarization-based OFHT measures the flying height of a slider with respect to a rotating glass disk by analysis of the polarization-dependent properties of light reflected from the slider-disk interface. This technique is referred to herein as polarization analysis, and preferably provides the relative phase between two polarization components of the reflected light, as well as the intensities of the two polarization components.

In a first, presently-preferred embodiment of the present invention, in a first step, polarization analysis is performed on the disk alone, with the slider removed, at one or more positions on the disk. In a next step, a characteristic or plurality of characteristics of the disk related to its birefringence properties are calculated, based on the results of the polarization analysis performed on the disk alone. In a further step, the slider is loaded onto the disk in the usual position for flying height measurement. In a next step, polarization analysis is applied to the disk-slider interface. In a final step, the flying height is calculated using the results of the polarization analysis of the disk-slider interface together with the previously-measured birefringence characteristics of the disk.

In an alternative embodiment of the present invention, the plane of incidence of the measurement beam is preferably perpendicular to a radius line drawn from the center of the disk to the measurement point. This measurement geometry is referred to herein as the zero skew position. In a first step, the polarization analysis is performed on the disk alone, with the slider removed, at a zero skew position. In a next step, a phase offset value is calculated, based on the results of the polarization analysis. In a further step, the slider is loaded onto the disk in the usual position for flying height measurement. In a next step, polarization analysis is applied to the disk-slider interface. In a final step, the flying height is calculated using the results of the polarization analysis of the disk-slider interface together with the previously-measured phase offset.

In another alternative embodiment of the present invention, the slider is gradually brought either closer to or away from the disk, in a process commonly referred to as either a slider load or unload, respectively. In a first step, during the slider load or unload, a conventional computer or like electronic data storage device conventionally records the results of the polarization analysis. In a next step, the results of the polarization analysis performed during loading or unloading are further processed to determine a characteristic of the polarization analysis attributable to birefringence in the disk. In a next step, polarization analysis is applied to the disk-slider interface. In a final step, the flying height is calculated using the results of the polarization analysis of the disk-slider interface together with the previously-measured birefringence characteristics of the disk.

In still another alternative embodiment of the present invention, the same polarization interferometer that performs the flying height measurement is employed to determine the complex index of refraction of the slider surface. In a first step, the polarization analysis is performed on the disk alone, with the slider removed, at one or more positions on the disk. In a next step, a characteristic or plurality of characteristics of the disk related to its birefringence properties are calculated, based on the results of the polarization analysis. In a next step, during the slider load or unload, a conventional computer or like electronic data storage device conventionally records the results of the polarization analysis. In a final step, the results of the polarization analysis performed during loading or unloading are combined with the previously-measured birefringence characteristics of the disk to determine the complex index of refraction.

BRIEF DESCRIPTION OF THE DRAWINGS

In the drawings, wherein like reference characters denote similar elements throughout the several views.

DETAILED DESCRIPTION OF THE INVENTION

Birefringence in rotating glass disks

As was noted in the above description of the prior art, the most frequently-encountered optical flying height testers (OFHT's) employ a plane-parallel glass disk in place of the magnetic hard disk of an actual data storage device. The slider that carries the electronic read-write head is carried in a slider, which is viewed through the disk and analyzed for flying height using one surface of the glass disk as a reference surface. The disk is attached to a spindle and is normally in rapid rotation, with typical rotation speeds being between 3,000 rpm and 12,000 rpm.

The rapid rotation of the glass disk engenders a stress pattern related to the centripetal forces required to maintain the integrity of the glass disk. It is well understood in the art that when glass is subjected to internal stresses, such as are generated when a glass disk is rotated at high speed, the index of refraction varies throughout the material, and in particular, it becomes a function of the polarization state of a light beam passing through the glass. The polarization dependence of the index of refraction is commonly referred to in the art as birefringence. The relation between stress and birefringence is described on pages 703–705 of the book entitled *Principles of Optics*, ($6^{th}$ Edition, Pergamon Press, Oxford, 1987) by M. Born and E. Wolf.

An important consequence of birefringence is that it modifies the polarization state of a light beam passing through the birefringent material. For small amounts of birefringence, the modification may be described by a form of matrix mathematics known in the art as Jones Calculus (see G. Fowles, Introduction to Modern Optics (Dover, 1975), pp.33–36). The polarization state of a light beam may be represented by a 2×1 matrix:

$$E = \begin{pmatrix} E_s \\ E_p \end{pmatrix} \quad (1.)$$

where the s and p subscripts refer to a polarization parallel and perpendicular to the plane of incidence of the light beam with respect to a surface of the glass disk.

In accordance with the present invention, the net modification imparted upon the beam after passing through a birefringent glass disk may be represented by a 2×2 matrix $$B = \begin{pmatrix} b_\| & b_\perp \\ b_\perp & b_\| \end{pmatrix} \quad (2.)$$

where the parameters $b_\|$, $b_\perp$ are related to disk birefringence. In general, the values of $b_\|$, $b_\perp$ vary with the position on the disk and the orientation of the incident beam. To calculate the resultant electric field E', the incident field E is multiplied by the birefringence matrix B:

$$E' = BE. \quad (3.)$$

The result of the matrix multiplication is $$E'_s = b_\| E_s + b_\perp E_p \quad (4.)$$

$$E'_p = b_\| E_p + b_\perp E_s. \quad (5.)$$

These calculations show how the birefringence phenomenon modifies the electric field E, and in particular, how birefringence introduces a coupling between the two electric field polarizations s and p. The absence of birefringence is represented in this calculus by $b_\|=1$ and $b_\perp=0$.

Birefringence and Flying Height Testing

As has been noted in the above description of the prior art, a particular class of prior art OFHT employs polarized light beams and polarization-dependent interference phenomena to determine flying height. A common characteristic of such polarization-based OFHT's is a single light beam or combination of light beams incident at an oblique angle. For example, my commonly owned copending U.S. patent application Ser. No. 08/408907 entitled "Optical Gap Measuring Apparatus and Method", describes an OFHT in which a single polarized light beam is directed through the glass disk towards the slider. The combined reflections from the slider surface and the surface of the glass disk modify the polarization state of the beam. The net modification imparted upon the beam after reflection is represented by a 2×2 matrix $$S = \begin{pmatrix} z_s & 0 \\ 0 & z_p \end{pmatrix}, \quad (6.)$$

where $z_{s,p}$ are the effective reflectivities of the slider-glass combination. The mathematical expressions for the effective reflectivities $z_{s,p}$ are known in the art as thin-film equations, and are provided in my aforementioned copending U.S. patent application Ser. No. 08/408907 the contents of which are incorporated by reference herein. In the absence of birefringence, the reflected electric field E''' is calculated from $$E''' = SE \quad (7.)$$

In terms of the components of E''', the calculation works out to $$E'''_s = z_s E_s \quad (8.)$$

$$E'''_p = z_p E_p \quad (9.)$$

The electric field E''' may also be expressed in terms of a phase θ and two intensities $I_s$, $I_p$, as follows:

$$\theta = \arg(E'''_s) - \arg(E'''_p) \quad (10.)$$

$$I_s = |E'''_s|^2 \quad (11.)$$

$$I_p = |E'''_p|^2 \quad (12.)$$

The measurement parameters θ, $I_s$, $I_p$ provide the necessary information for determining the flying height.

The equations in the previous paragraph are sufficiently accurate for the case where the disk is substantially free of birefringence. However, if there is birefringence in the disk, the calculation must be modified to include a birefringence matrix for the incident path ($B_1$) and the exit path ($B_2$) of the beam. These modifications can have an important effect on the accuracy of the flying height measurement, as will presently be shown.

In the presence of birefringence, the electric field E''' represented in Eq.(7) must be replaced with $$E^b = (B_2 S B_1) E \quad (13.)$$

where $$B_1 = \begin{pmatrix} b_\| & b_\perp \\ b_\perp & b_\| \end{pmatrix} \quad (14.)$$

$$B_2 = \begin{pmatrix} b_\| & -b_\perp \\ -b_\perp & b_\| \end{pmatrix} \quad (15.)$$

This may also be written $$E^b = S^b E, \quad (16.)$$

where $$S^b = \begin{pmatrix} z'_s & z'_\perp \\ -z'_\perp & z'_p \end{pmatrix} \quad (17.)$$

for $$z'_p = z_p \bar{b}_\|^2 + z_s |b_\perp|^2 \quad (18.)$$

$$z'_s = z_s b_\|^2 + z_p |b_\perp|^2 \quad (19.)$$

$$z'_\perp = (z_s b_\| - z_p \bar{b}_\|) b_\perp \quad (20.)$$

In terms of the components of the electric field $E^b$, $$E_s^b = z'_s E_s + z'_\perp E_p \quad (21.)$$

$$E_p^b = z'_p E_p - z'_\perp E_s \quad (22.)$$

Note that when there is no birefringence in the glass disk $b_\|=1$, $b_\perp=0$, $S^b=S$, $z'_p=z_p$, $z'_s=z_s$ and $z'_\perp=0$. Thus in the absence of birefringence, $E^b=E'''$.

The effect of birefringence on the flying height measurement is made more clear by considering the limit case of small but non-zero birefringence and an input electric field E having equal s and p components. For this case, the measurement parameters $\theta$, $I_s$, $I_p$ are replaced by analogous parameters $\theta^b$, $I_s^b$, $I_p^b$, respectively, given by the approximate formulas $$\theta^b = \theta + \Delta\theta \tag{23.}$$

$$I_s^b = I_s - \Delta I \tag{24.}$$

$$I_p^b = I_p + \Delta I \tag{25.}$$

where $$\Delta\theta = \theta_0 + a \frac{I_s - I_p}{\sqrt{I_s I_p}} \cos(\theta) \tag{26.}$$

$$\Delta I = 2a \sqrt{I_s I_p} \sin(\theta) \tag{27.}$$

for $$\theta_0 = 4\arg(b_\parallel) \tag{28.}$$

$$\alpha = +ib_\perp. \tag{29.}$$

These equations clearly show additive distortions $\Delta\theta$, $\Delta I$ related to the birefringence parameters $b_\parallel$, $b_\perp$. If these additive distortions are neglected, the measurement will have errors proportional to the degree of birefringence in the disk.

From the preceding discussion, it is evident that birefringence phenomena in the glass disk of a polarization-based OFHT modify the measurement in a potentially deleterious manner, if these phenomena are not fully included in the data analysis method. Although the preceding discussion is in the context of a particular form of polarization-based OFHT, it will be evident to those skilled in the art that similar calculations must be performed for any OFHT employing polarized light. It will also be appreciated by those skilled in the art that it is possible to model mathematically a characteristic or plurality of characteristics of the disk related to its birefringence using parameters other than the $b_\parallel$, $b_\perp$ parameters defined herein, while not departing significantly from the essential conclusions of the discussion.

In terms of the preceding mathematical discussion, a principle objective of the present invention is to measure the birefringence parameters $b_\parallel$, $b_\perp$ or analogous parameters so that they may be included in the data analysis of a polarization-based OFHT.

Presently Preferred Embodiment

It is possible to calculate the exact values of $b_\parallel$, $b_\perp$ for various rotations speeds, glass types and disk dimensions, but the mathematics are unnecessarily complicated for the purposes of the present discussion. The important conclusions of the mathematical analysis incorporated in the method of the present invention are as follows. The circular symmetry of the disk imposes a circular symmetry to the stress pattern. This circular symmetry is also found in the birefringence, and manifests itself in the variation of $b_\parallel$, $b_\perp$ as a function of position and beam orientation. Circular symmetry also makes it possible to measure $b_\parallel$, $b_\perp$ directly, using the method and apparatus of the present invention.

Figure 1:
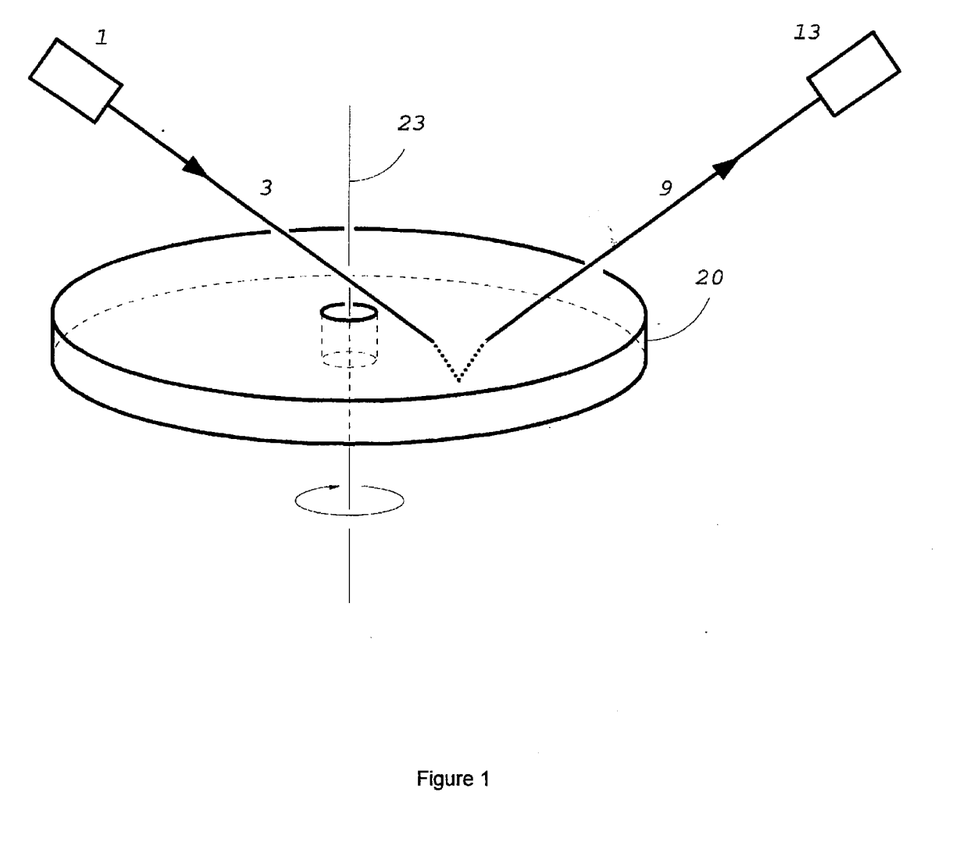
FIG. 1 is a perspective drawing showing the presently preferred embodiment of the present invention.
Figure 2:
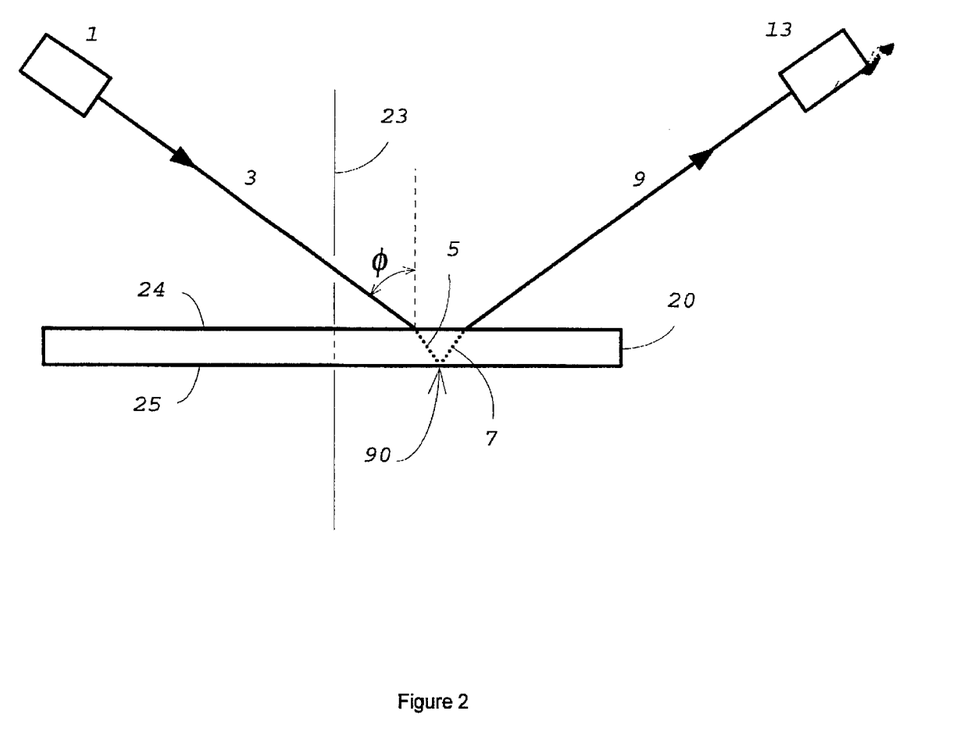
FIG. 2 is drawing showing a side view of the presently preferred embodiment of FIG. 1.
Figure 3:
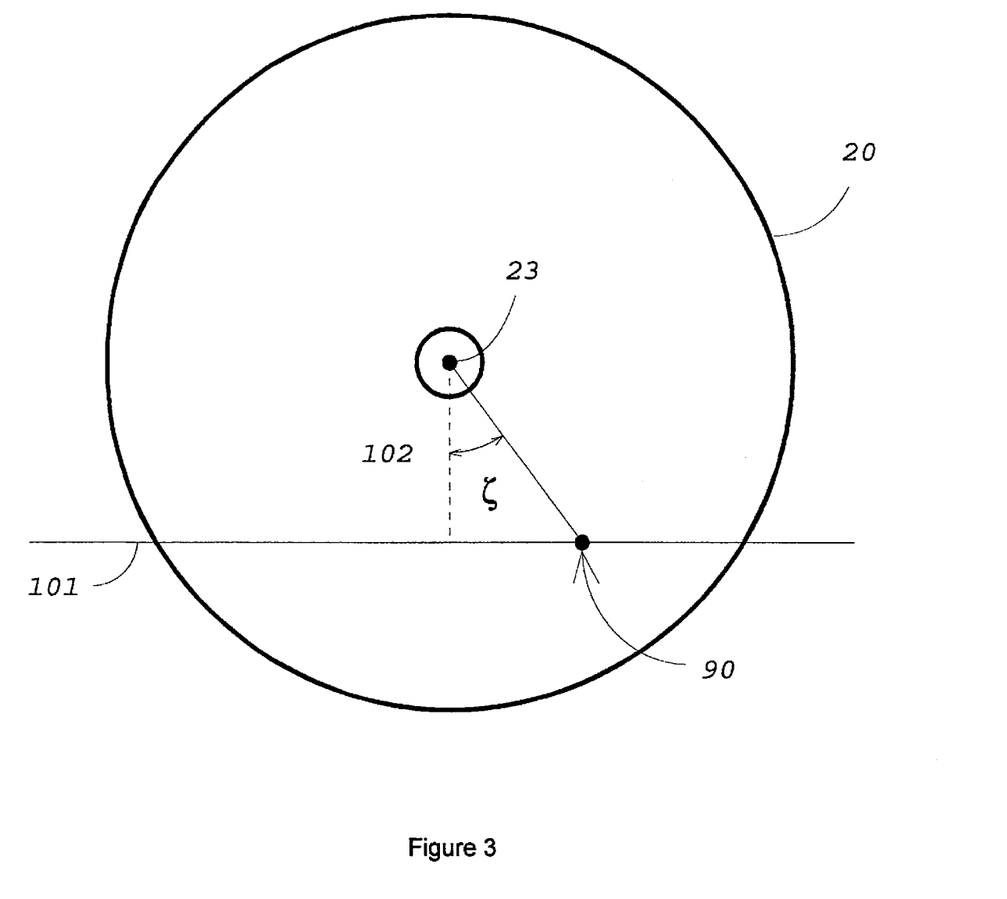
FIG. 3 is drawing showing a top view of the presently preferred embodiment of FIG. 1.

The presently preferred method and apparatus of the present invention are made more clear by reference to FIGS. 1 through 3, which show the presently preferred embodiment in a perspective view, a side view and a top view, respectively. Referring now in particular to FIG. 2, there is shown an incident beam 3 impinging upon a surface 24 of plane-parallel glass disk 20, preferably at an angle $\phi$ not equal to zero. The illumination for the measurement is preferably provided by polarized light source 1, which may be a laser, an incandescent lamp, a discharge lamp or the like, together with such means as are needed to polarize incident beam 3. The plane of incidence of incident beam 3 preferably defines a polarization basis vector p, to which is associated an orthogonal basis vector s. Preferably the polarization of light beam 5 is such so that both s- and p-type polarizations are present. A refracted portion 5 of beam 3 passes through the glass towards a measurement point 90 of a reference surface 25 of disk 20. A reflected portion 7 of beam 5 passes back through the glass and is refracted back into space as a beam 9. Beam 9 then enters a phase detector 13, which measures the difference $\theta$ in phase between the s and polarizations.

Referring now to FIG. 3, there is shown an alternative view of the apparatus showing in particular a plane of incidence 101 defined by beams 3 and 9 (not shown in FIG. 3). Of special interest is a skew angle $\zeta$ between plane of incidence 101 drawn through measurement point 90 perpendicular to a radius line 102. In accordance with the teachings of the present invention, it can be shown that the birefringence parameter $b_\perp$ is asymmetric with respect to radius line 102, which is to say that $b_\perp$ has the same magnitude at $+\zeta$ and $-\zeta$ but opposite sign. It can further be shown that the birefringence parameter $b_\parallel$ is symmetric with respect to radius line 102, which is to say that $b_\parallel$ has the same value at $+\zeta$ and $-\zeta$. These symmetry properties are preferably exploited to derive various procedures and formulas for calculating $b_\parallel$, $b_\perp$.

In the presently-preferred method of the present invention, the presently preferred apparatus shown in FIG. 2 measures the phase $\theta_G$ of reflected beam 9 as a function of the position defined by measurement point 90 on surface 25. The subscript G refers to a phase measurement made directly from the glass disk, with the slider removed. The variation of phase $\theta_G$ with respect to position provides the birefringence parameters $b_\parallel$, $b_\perp$ for one or more positions on the disk. Referring now to FIG. 3, an example of a preferred procedure for the presently-preferred method of the present invention is as follows. In a first step, a phase $\theta_G = \theta^{(-)}$ is measured at a skew angle of $-\zeta$. In a next step, a phase $\theta_G = \theta^{(+)}$ is measured at a skew angle $+\zeta$, corresponding to the final measurement point 90 shown in FIG. 3. In a further step, the birefringence parameters $b_\parallel$, $b_\perp$ for measurement point 90 are calculated from $$b_\parallel = \exp\left(\frac{\theta^{(-)} + \theta^{(+)} + 2\pi}{-8i}\right) \tag{30.}$$

$$b_\perp = \frac{\theta^{(+)} - \theta^{(-)}}{2iR} \tag{31.}$$

where $$R = \frac{R_s - R_p}{\sqrt{R_s R_p}} \tag{32.}$$

and $R_s$, $R_p$ are the intensity reflectivities of surface 25 for the s,p polarizations, respectively. These calculations follow from Eqs.(23),(26),(28),(29) above, together with the aforementioned symmetry properties of $b_\parallel$, $b_\perp$.

As a final step in the presently preferred method, the birefringence parameters $b_\parallel$, $b_\perp$ are included in the calculation of flying height. This step depends on the particular form of OFHT employed to perform the measurement. As an example, the OFHT disclosed in my aforementioned copending U.S. patent application Ser. No. 08/408907 includes the birefringence parameters $b_\|$, $b_\perp$ according to the teachings provided herein, and in particular, Eqs.(23)–(29).

It is noteworthy that the presently preferred apparatus shown in FIGS. 1 through 3 may be added onto an existing prior-art OFHT, or may be included as part of an OFHT comprising substantially the same elements as are shown in FIGS. 1 through 3. Therefore some or all of the shown elements of this and other embodiments of the present invention may also be used for actual flying height test measurements, as would be evident to someone skilled in the art, so as to facilitate the implementation of the complete system and reduce its overall cost.

Alternative Embodiments

In the first instance, an alternative embodiment of the present invention may be considered which is a special case of the presently preferred embodiment shown in FIGS. 1–3, and which is included here because of its particular usefulness. In this regard, it will be readily appreciated upon inspection of Eqs.(30) and (31) that when measurement point 90 corresponds to a zero-skew position, $$b_\perp = 0 \qquad (\zeta = 0) \qquad (33.)$$

$$\arg(b_\|) = -\frac{\theta^{(+)} + \pi}{4} \qquad (\zeta = 0) \qquad (34.)$$

For this special case, the effect of birefringence on the electric field $E^b$ is reduced to a constant phase offset $\theta_0 = -(\theta^{(+)} + \pi)$, which should be subtracted from the measured difference in phase between the s and p polarizations to correct for birefringence.

Therefore, an alternative embodiment of the present invention, employing substantially the same apparatus as is shown in FIGS. 1 through 3 may be provided in which the measurement point 90 is presumed to be such that there is a zero skew angle $\zeta$. In accordance with this alternative embodiment, in a first step, a constant phase offset $\theta_0$ is measured by means of phase detector 13. In a next step, constant phase offset $\theta_0$ is subtracted from all subsequent phase measurements related to flying height testing to compensate for birefringence.

Figure 4:
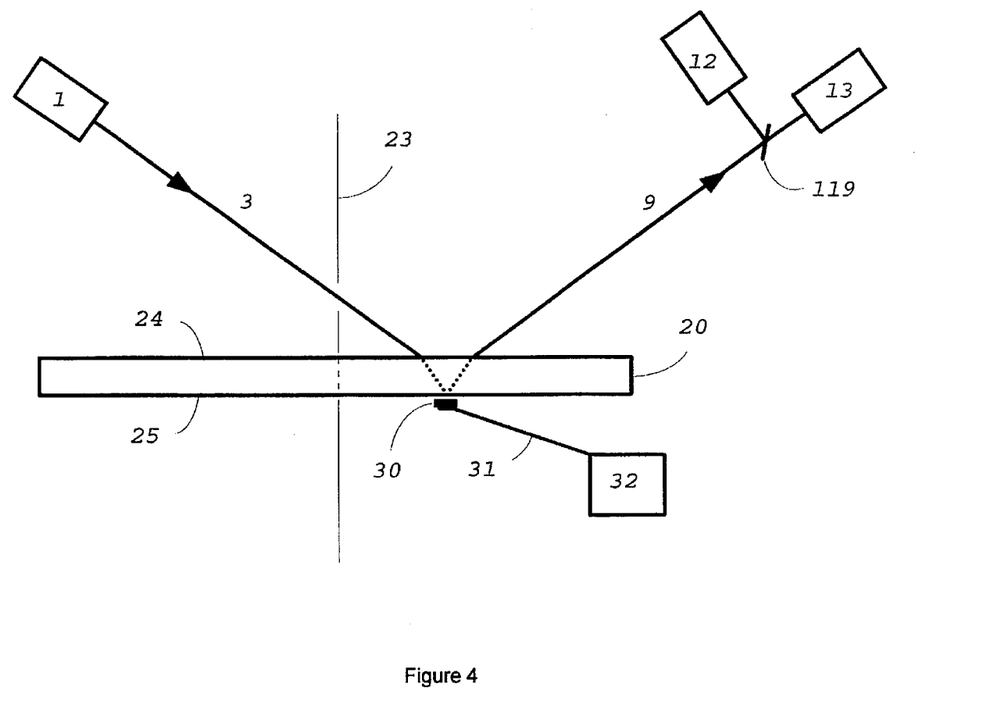
FIG. 4 is a drawing showing an alternative embodiment of the present invention.

In some situations, it may be found advantageous to compensate for the effects of birefringence in the glass disk using actual flying height data, rather than independent phase measurements with the slider removed, as is prescribed for the embodiments of the invention described above. Referring now to FIG. 4, there is shown an apparatus representing an alternative embodiment of a polarization-based OFHT comprising such minimum elements as are required to perform flying height testing according to the teachings of my aforementioned copending U.S. patent application Ser. No. 08/408907. In addition to the elements analogous to those presented in FIGS. 1 through 3, and denoted by like reference characters, there is shown in FIG. 4 a slider 30 in close proximity to reference surface 25 of glass disk 20. Also shown in and mentioned in FIG. 4 is a mechanical arm 31 used to position slider 30 with respect to measurement position 90. Mechanical arm 31 is preferably actuated by a loading mechanism 32, such as is common in commercial flying-height test systems. In normal usage, loading mechanism 32 brings slider 30 nearly into contact with reference surface 25 by displacing it gradually from a distance greater than one wavelength of the source light along a direction substantially perpendicular to surface 25.

As a further addition to the embodiment FIG. 4 with respect to the embodiment shown in FIGS. 1 through 3, there is a beam splitter 119 and an intensity detector 12, which may be an independent optical system or may be incorporated in the phase detection means, as is taught for example in my commonly owned copending U.S. Patent Application entitled "Homodyne Interferometric Receiver and Method", filed Sep. 5, 1995 and bearing Ser. No. 08/523,559 the contents of which are incorporated by reference herein. Intensity detector 12 measures a value that may be expressed mathematically as $$I^b = I_s^b + I_p^b \qquad (35.)$$

It is a characteristic of birefringence that the total measured intensity $I^b$ of beam 9, that is to say the intensity integrated over all polarizations as represented in Eq.(35), is nearly independent of the degree of birefringence. This is evident from the sum of Eqs.(24) and (25). It will, therefore, be appreciated that a comparison of the intensity variations with phase variations during a load or unload of slider 30 provides information concerning phase distortions caused by birefringence. In particular, this embodiment of the invention preferably provides the value of the factor a shown in Eq.(29) by minimizing the difference between the flying heights as determined by intensity variations and the flying height determined by phase variations.

Therefore in this, alternative embodiment of the present invention, in a first step, slider 30 is either unload or loaded from glass disk 20. During the slider load or unload, a conventional computer or like electronic data storage device (not shown) conventionally records the results of polarization analysis. In a next step, the results of the polarization analysis performed during loading or unloading are further processed to determine a characteristic of the polarization analysis attributable to birefringence in the disk. In a next step, polarization analysis is applied to the disk-slider interface. In a final step, the flying height is calculated using the results of the polarization analysis of the disk-slider interface together with the previously-measured birefringence another characteristics of the disk.

Figure 5:
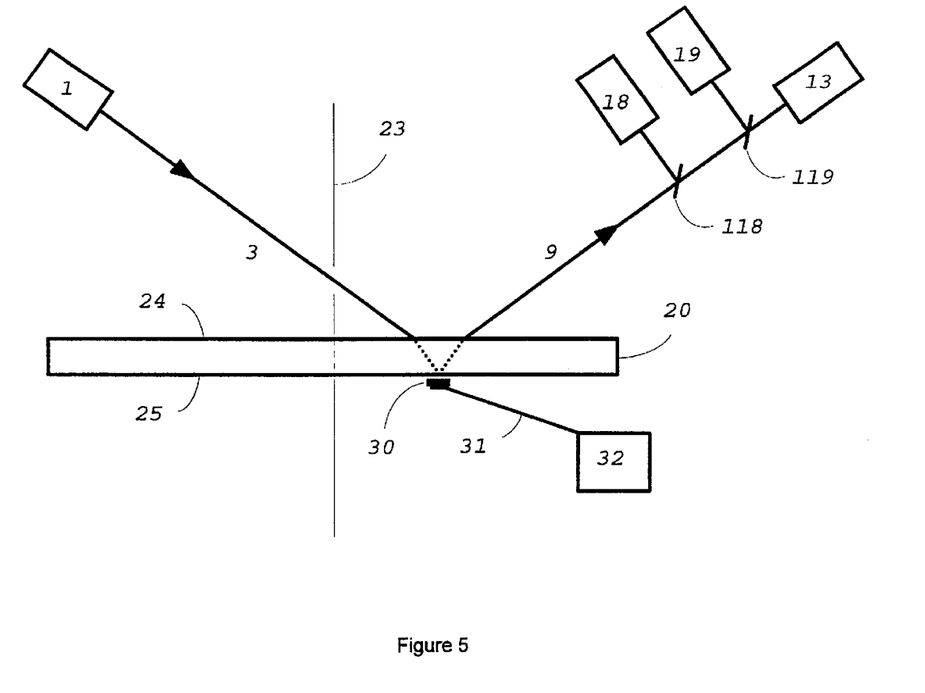
FIG. 5 is a drawing showing another alternative embodiment of the present invention.

Still another alternative embodiment may be described in the reference to FIG. 5. As was noted in the description of the prior art, it is generally required in the calculation of flying height to consider the phase change that occurs at the slider surface upon reflection. It is, therefore, advantageous to measure the complex index of refraction so as to calculate the phase change on reflection. It is further advantageous to perform this measurement in situ. It is, therefore, an objective of the present invention to compensate centripetal birefringence in a rapidly rotating glass disk so as to accurately measure the complex index of refraction of the slider in situ.

Accordingly, referring now to FIG. 5, there is shown an alternative embodiment of the present invention which comprises such elements as are necessary to determine the complex index of refraction. In addition to the elements analogous to those presented in FIGS. 1 through 3 and denoted by like reference characters, there is shown in FIG. 5 a slider 30 in close proximity to reference surface 25 of glass disk 20. Also shown and mentioned in FIG. 5 is a mechanical arm 31 used to position slider 30 with respect to measurement position 90. Mechanical arm 31 is preferably actuated by a loading mechanism 32, such as is common in commercial flying-height test systems. In normal usage, loading mechanism 32 brings slider 30 nearly into contact with reference surface 25 by displacing it gradually from a distance greater than one wavelength of the source light along a direction substantially perpendicular to surface 25.

Further additions to the embodiment of FIG. 5 with respect to the embodiment of FIGS. 1 through 3 are a beam splitter 118, an s-intensity detector 18, a beam splitter 119 and a p-intensity detector 19. Intensity detectors 18 and 19 may be an independent optical system or may be incorporated in the phase detection means, as is taught, for example, in my aforementioned copending U.S. patent application bearing Ser. No. 08/523,559. Intensity detectors 18 and 19 measure intensities $I_s^b$, $I_p^b$, respectively. Since the measured values of $\theta^b$, $I_s^b$, $I_p^b$ depend on the material properties of the slider, the measured values of $\theta^b$, $I_s^b$, $I_s^b$ provide sufficient information to calculate the complex index of refraction. The data processing preferably consists of minimizing the difference between the measured values of $\theta^b$, $I_s^b$, $I_s^b$ and their predicted theoretical values. The algorithm for achieving such minimization may for example be a conventional iterative least-squares search.

The complex index measurement in the presence of disk birefringence requires knowledge of birefringence parameters $b_\parallel$, $b_\perp$ or their equivalents. The measurement of these parameters may preferably proceed in substantially the same way as was described for the presently preferred embodiment of the invention shown in FIGS. 1–3; i.e., one or more phase measurements are made directly from disk 20, with slider 30 removed. Example calculations are shown in Eqs.(30.) and (31.). The results are subsequently included in calculation of the theoretical values of $\theta^b$, $I_s^b$, $I_p^b$.

Therefore in this alternative embodiment of the present invention, in a first step, the polarization analysis is performed on disk 20 alone, with slider 30 removed, at one or more positions on disk 20. In a next step, a characteristic or plurality of characteristics of disk 20 related to its birefringence properties are calculated, based on the results of the polarization analysis. In a next step, during the slider load or unload, a conventional computer or like electronic data storage device (not shown) conventionally records the results of polarization analysis. In a final step, the results of the polarization analysis performed during loading or unloading are combined with the previously-measured birefringence characteristics of disk 20 to determine the complex index of refraction of slider 30.

As discussed above, the present invention overcomes many of the problems in the prior art, such as in magnetic data storage systems where it is required to measure the flying height of a slider on a rapidly rotating rigid disk in order to verify the performance of the slider assembly. Some forms of such prior art optical flying height tester use polarization as part of the measurement. Since polarized light is effected by birefringence phenomena in a rotating glass disk, it is essential to measure and compensate for these phenomena. Whereas the prior art provides no methods or means for performing such compensation, the present invention provides a method and means for measuring and compensating birefringence generated by centripetal stresses in rapidly rotating disks using a measurement principle based on the circular symmetry of the birefringence phenomena. The various preferred embodiments disclosed herein cover direct measurement of birefringence from the glass disk with the slider removed, as well as compensation techniques based on interpretation of data acquired while loading or unloading the slider. The methods of the present invention apply not only to the measurement of flying height, but also to the determination of the complex index of refraction in situ. Moreover, the apparatus of the present invention are compatible with known forms of polarization-based OFHT's and may be incorporated in such systems at minimal cost.

It will be appreciated by those skilled in the art that the teachings of the present invention may be applied to alternative flying height systems that depend in part on polarization effects for their successful use. For example, it may prove advantageous for some applications to combine a known form of flying height sensor operating at normal incidence with a known form of ellipsometer for measuring the complex index in situ, as noted in the description of the prior art. Moreover, since commonly-known ellipsometric analysis also requires birefringence compensation, the teachings of the present invention may be advantageously applied to such systems.

It will also be appreciated by those skilled in the art that various omissions and substitutions and changes in form or detail of the disclosed methods and apparatus of the present invention may be made without departing from the spirit and scope of the present invention. For example, although the various embodiments preferably employ phase measurements to calculate birefringence, the apparatus shown in FIG. 5 provides intensity information that may be used to calculate birefringence in a similar fashion, according to the teachings provided herein. It will also be appreciated that various lenses, mirrors or like optical elements may be added to or subtracted from the embodiments shown in the drawings to facilitate implementation of the various embodiments, without departing significantly from the method and apparatus of the present invention.

What is claimed is:

1. A polarization based optical flying height tester apparatus for measuring and compensating for birefringence in a rotating glass disk having a first surface upon which polarized light impinges and a reference surface opposed thereto, said apparatus comprising said disk and further comprising a polarized light source for providing an incident beam impinging on said first disk surface at a predetermined angle, said disk having a birefringence characteristic associated therewith, said incident beam comprising a plane of incidence defining a polarization basis vector to which is associated an orthogonal basis vector, said polarized light comprising both said polarizations, said disk refracting a first portion of said beam passing therethrough to a measurement point on said reference surface, said first portion of said refracted beam being reflected back from said reference surface through said glass disk and being refracted back through said glass disk first surface into space for providing a second refracted beam; phase detector means disposed above said first surface and optically aligned with said second refracted beam for measuring any difference in phase between said polarizations in said second refracted beam, said phase detector means comprising means for performing a polarization analysis on said disk at at least one position on said disk and for calculating at least one characteristic of said disk related to said associated birefringence characteristic thereof based on said polarization analysis; slider means disposed in close proximity to said reference surface; and means for positioning said slider means with respect to said measurement point for bringing said slider means adjacent to said reference surface at said measurement point, said positioning means comprising means for at least loading or unloading said slider means, said disposed slider means comprising a slider-disk interface with respect to said disk, said phase detector means further comprising means for applying said polarization analysis to said slider-disk interface and for determining the flying height based on said polarization analysis and said associated birefringence characteristic of said disk.

2. An apparatus in accordance with claim 1 wherein said means for positioning said slider means with respect to said measurement point for bringing said slider means adjacent to said reference surface at said measurement point comprises means for bringing said slider means nearly in contact with said reference surface at said measurement point.

3. An apparatus in accordance with claim 2 wherein said polarized light source comprises a laser.

4. An apparatus in accordance with claim 2 wherein said polarized light source comprises an incandescent lamp.

5. An apparatus in accordance with claim 2 wherein said polarized light source comprises a discharge lamp.

6. An apparatus in accordance with claim 1 wherein said phase detector means further comprises means for measuring intensity values and for comparing variations in said measured intensity values with phase variations during said loading and unloading of said slider means for minimizing the difference between the flying height as determined by said intensity variations and the flying height as determined by said phase variations.

7. An apparatus in accordance with claim 6 wherein said means for positioning said slider means with respect to said measurement point for bringing said slider means adjacent said reference surface at said measurement point comprises means for bringing said slider means nearly in contact with said reference surface at said measurement point.

8. An apparatus in accordance with claim 1 wherein said measurement point corresponds to a zero skew position, said means for performing said polarization analysis comprising means for determining a phase offset and for determining the flying height based on said polarization analysis of said slider-disk interface and said phase offset.

9. An apparatus in accordance with claim 8 wherein said means for performing said polarization analysis comprises means for performing said polarization analysis on said disk alone at said zero skew position and for applying said polarization analysis to said slider-disk interface, said phase offset determining means determining said phase offset based on said polarization analysis on said disk alone.

10. An apparatus in accordance with claim 1 further comprising means for recording said polarization analysis during said at least loading or unloading of said slider means and for processing said recorded polarization analysis for determining a characteristic of said polarization analysis attributable to birefringence in said disk, said phase detector means for determining said flying height comprising means for determining said flying height based on said polarization analysis of said slider-disk interface and said determined characteristic attributable to birefringence in said disk.

11. An apparatus in accordance with claim 1 further comprising means for determining a complex index of refraction of the slider surface based on said polarization analysis.

12. An apparatus in accordance with claim 11 further comprising means for recording said polarization analysis during said at least loading or unloading of said slider means, said means for performing said polarization analysis comprising means for performing said polarization analysis on said disk alone and for determining a characteristic of said disk related to its birefringence properties based on said polarization analysis on said disk alone, said means for determining said complex index of refraction comprising means for providing said complex index of refraction from said recorded polarization analysis during said at least loading or unloading of said slider means and said determined birefringence characteristic of said disk.

13. An apparatus in accordance with claim 1 wherein said polarized light source comprises a laser.

14. An apparatus in accordance with claim 1 wherein said polarized light source comprises an incandescent lamp.

15. An apparatus in accordance with claim 1 wherein said polarized light source comprises a discharge lamp.

16. An apparatus in accordance with claim 1 wherein said phase detector further comprises means for performing said polarization analysis on said disk at a plurality of positions on said disk.

17. An apparatus for measuring and compensating for birefringence in a rotating, glass disk having a first surface upon which polarized light impinges and a reference surface opposed thereto said apparatus comprising a polarized light source for providing an incident beam impinging on said first disk surface at an angle $\phi$, said incident beam comprising a plane of incidence defining a polarization basis vector p to which is associated an orthogonal basis vector s, said polarized light comprising both said s and p type polarizations, said disk refracting a first portion of said beam passing therethrough to a measurement point on said reference surface, said first portion of said refracted beam being reflected back from said reference surface through said glass disk and being refracted back through said glass disk first surface into space for providing a second refracted beam; and phase detector means disposed above said first surface and optically aligned with said second refracted beam for measuring any difference $\theta$ in phase between said s and p polarizations in said second refracted beam, said second refracted beam having an associated phase $\theta_G$ made directly from said glass disk and comprising a function of position defined by said measurement point on said reference surface of said glass disk, any variation of said phase $\theta_G$ with respect to said position providing birefringence parameters $b_\parallel$, $b_\perp$ for said positions on said disk, said incident beam and said second refracted beam defining a plane of incidence, a skew angle $\zeta$ being defined between said plane of incidence drawn through said measurement point perpendicular to a radius line for said disk, $b_\parallel$ being symmetric with respect to said radius line and $b_\perp$ being asymmetric with respect to said radius line, said phase detector means comprising means for measuring said phase $\theta_G$ at said skew angle $+\zeta$ and $-\zeta$ with said birefringence parameters $b_\parallel$, $b_\perp$ for said measurement point being determined in accordance with the expression $$b_\parallel = \exp\left( \frac{\theta^{(-)} + \theta^{(+)} + 2\pi}{-8i} \right)$$

$$b_\perp = \frac{\theta^{(+)} - \theta^{(-)}}{2iR}$$

$$R = \frac{R_s - R_p}{\sqrt{R_s R_p}}$$

and $R_s$, $R_p$ are the intensity reflectivities of said disk surface for said s and p polarization, respectively.

18. An apparatus in accordance with claim 17 wherein said apparatus comprises a flying height tester, said measurement point corresponding to a zero skew position wherein $b_\perp = 0$ and $$\arg(b_\parallel) = -\frac{\theta^{(+)} + \pi}{4},$$

any effect of birefringence on any electric field $E^b$ being reduced to a constant phase offset $\theta_0 = -(\theta^{(+)} + \pi)$, said phase offset being subtracted from said measured difference in phase between said s and p polarizations to correct for said birefringence, said phase detector means measuring said constant phase offset $\theta_0$ and further comprising means for subtracting subsequent phase measurements related to said flying height testing for compensating for said birefringence.

19. An apparatus in accordance with claim 17 wherein said polarized light source comprises a laser.

20. An apparatus in accordance with claim 17 wherein said polarized light source comprises an incandescent lamp.

21. An apparatus in accordance with claim 17 wherein said polarized light source comprises a discharge lamp.

22. An apparatus in accordance with claim 17 wherein said apparatus further comprises an optical flying height tester, said optical flying height tester comprising said disk.

23. An apparatus in accordance with claim 17 wherein said apparatus comprises a polarization based optical flying height tester, said optical flying height tester comprising said disk, said apparatus further comprising slider means disposed in close proximity to said reference surface, means for positioning said slider means with respect to said measurement point for bringing said slider means nearly in contact with said reference surface at said measurement point, said positioning means comprising means for loading and unloading said slider means, said phase detector means further comprising beam splitter means and intensity detector means for measuring intensity values in accordance with the expression $I^b = I_s^b + I_p^b$, and means for comparing variations in said measured intensity values with phase variations $\theta^b$ during said loading and unloading of said slider means for minimizing the difference between the flying height as determined by said intensity variations $I^b$ and the flying height as determined by said phase variations $\theta^b$.

24. An apparatus in accordance with claim 23 wherein said beam splitter means and said intensity detector means comprise separate beam splitters and intensity detectors for said s and p polarizations, with said s and p intensity detectors, respectively, measuring $I_s^b$ and $I_p^b$ separately, said measured values of $\theta^b$, $I_s^b$, $I_p^b$ providing sufficient information for enabling a complex index of refraction of said slider means to be determined, said intensity values $I_s^b$ and $I_p^b$, and said phase values $\theta^b$ having predictable theoretical values associated therewith, said comparing means comprising means for minimizing any difference between said measured values of $\theta^b$, $I_s^b$, $I_p^b$ and said predictable theoretical values.

25. A method for measuring and compensating for birefringence in a rotating glass disk in a polarization based optical flying height tester having a first surface upon which polarized light impinges and a reference surface opposed thereto and having a slider means disposable in close proximity to said reference surface for providing a slider-disk interface, said method comprising the steps of:

providing a polarized incident light beam to said first disk surface at a predetermined angle, said disk having a birefringence characteristic associated therewith said incident beam comprising a plane of incidence defining a polarization basis vector to which is associated an orthogonal basis vector, said polarized incident beam comprising both said polarizations;

refracting a first portion of said incident beam through said glass disk to a measurement point on said reference surface;

reflecting said refracted first portion of said incident beam back from said reference surface through said glass disk first surface into space for providing a second refracted beam;

phase detecting said second refracted beam for measuring any difference in phase between said polarizations in said second refracted beam, said phase detecting step further comprising the step of performing a polarization analysis on said disk at at least one position on said disk and calculating at least one characteristic on said disk related to said associated birefringence characteristic thereof based on said polarization analysis;

positioning said slider means with respect to said measurement point for bringing said slider means adjacent to said reference surface at said measurement point; and applying said polarization analysis to said slider-disk interface for determining the flying height based on said polarization analysis and said associated birefringence characteristic of said disk.

26. A method in accordance with claim 25 wherein said polarization analysis step comprises the step of performing said polarization analysis on said disk at a plurality of positions on said disk.

27. A method in accordance with claim 25 wherein said step of performing said polarization analysis comprises the step of performing said polarization analysis at a zero skew position, calculating a phase offset based on said polarization analysis, and the step of determining said flying height comprises determining said flying height based on said polarization analysis of said slider-disk interface and said phase offset.

28. A method in accordance with claim 25 further comprising the steps of at least loading or unloading said slider means and recording the results of said polarization analysis during said at least loading or unloading for processing said recorded polarization analysis, determining a characteristic of said recorded polarization analysis attributable to birefringence in said disk, and determining said flying height from said polarization analysis of said slider-disk interface and said birefringence characteristic of said disk.

29. A method in accordance with claim 25 further comprising the step of determining a complex index of refraction of the slider surface.

30. A method in accordance with claim 29 wherein said step of determining said complex index of refraction comprises the steps of performing said polarization analysis on said disk alone with said slider removed, determining a characteristic of said disk related to its birefringence properties based on said polarization analysis, recording the results of said polarization analysis during at least loading or unloading of said slider, and determining said complex index of refraction based on said polarization analysis during said at least loading or unloading of said disk and said determined birefringence characteristic of said disk.

31. A method for measuring and compensating for birefringence in a rotating ground glass disk having a first surface upon which polarized light impinges and a reference surface opposed thereto, said method comprising the steps of:

providing a polarized incident light beam to said first disk surface at an angle $\phi$, said incident beam comprising a plane of incidence defining a polarization basis vector p to which is associated an orthogonal basis vector s, said polarized incident beam comprising both said s and p type polarizations;

refracting a first portion of said incident beam through said glass disk to a measurement point on said reference surface;

reflecting said refracted first portion of said incident beam back from said reference surface through said glass disk first surface into space for providing a second refracted beam; and phase detecting said second refracted beam and measuring any difference $\theta$ in phase between said s and p polarizations in said second refracted beam, said second refracted beam having an associated phase $\theta_G$ made directly from said glass disk and comprising a function of position defined by said measurement point on said reference surface of said glass disk, any variation of said phase $\theta_G$ with respect to said position providing birefringence parameters $b_\parallel$, $b_\perp$ for said positions on said disk, said incident beam and said second refracted beam defining a plane of incidence, a skew angle $\zeta$ being defined between said plane of incidence drawn through said measurement point perpendicular to a radius line for said disk, $b_\parallel$ in being symmetric with respect to said radius line and $b_\perp$ being asymmetric with respect to said radius line, said measuring step comprising measuring said phase $\theta_G$ at said skew angle $+\zeta$ and $-\zeta$ with said birefringence parameters $b_\parallel$, $b_\perp$ for said measurement point being determined in accordance with the expression $$b_\parallel = \exp\left(\frac{\theta^{(-)} + \theta^{(+)} + 2\pi}{-8i}\right)$$

$$b_\perp = \frac{\theta^{(+)} - \theta^{(-)}}{2iR}$$

$$R = \frac{R_s - R_p}{\sqrt{R_s R_p}}$$

and $R_s$, $R_p$ are the intensity reflectivities of said disk surface for said s and p polarization, respectively.

32. A method in accordance with claim 31 wherein said polarized incident light beam providing step comprises the step of providing said polarized incident light beam to a first disk surface of a rotating glass disk in a flying height tester, said measurement point corresponding to a zero skew position wherein $b_\perp = 0$ and $$\arg(b_\parallel) = -\frac{\theta^{(+)} + \pi}{4},$$

any effect of birefringence on any electric field $E^b$ being reduced to a constant phase offset $\theta_0 = -(\theta^{(+)} + \pi)$, said phase offset being subtracted from said measured difference in phase between said s and p polarizations to correct for said birefringence, said measuring step further comprising the step of measuring said constant phase offset $\theta_c$ and subtracting subsequent phase measurements related to flying height testing for compensating for said birefringence.

33. A method in accordance with claim 31 wherein said polarized incident light beam providing step comprises the step of providing said polarized incident light beam to a first disk surface of a rotating glass disk in a flying height tester.

34. A method in accordance with claim 31 further comprising the step of positioning a slider with respect to said measurement point nearly in contact with said reference surface and loading and unloading said slider, said measuring step further comprising the step of measuring intensity values in accordance with the expression $I^b = I_s^b + I_p^b$ and comparing variations in said measured intensity values with phase variations $\theta^b$ during said loading and unloading of said slider for minimizing the difference between the flying height as determined by said intensity variations $I^b$ and the flying height as determined by said phase variations $\theta^b$.

35. A method in accordance with claim 34 wherein said intensity value measuring step comprises the step of separately measuring $I_s^b$, and $I_p^b$.

36. A method in accordance with claim 35 further comprising the step of determining a complex index of refraction for said slider from said measured values of $\theta^b$, $I_s^b$, and $I_p^b$.

37. A method in accordance with claim 31 wherein said measuring step further comprises the step of measuring intensity values in accordance with the expression $I^b = I_s^b + I_p^b$, and minimizing the difference between the flying height as determined by said intensity variations $I^b$ and the flying height as determined by phase variations $\theta^b$.

38. A method in accordance with claim 37 wherein said intensity value measuring step comprises the step of separately measuring $I_s^b$, and $I_p^b$.

39. A method in accordance with claim 31 wherein said measuring step further comprises the step of compensating for said birefringence by subtracting subsequent phase measurements relating to flying height testing.

\* \* \* \* \*